United States Patent
Jiang et al.

(10) Patent No.: US 11,886,720 B2
(45) Date of Patent: Jan. 30, 2024

(54) DETERMINING STORAGE SYSTEM CONFIGURATION RECOMMENDATIONS BASED ON VERTICAL SECTORS AND SIZE PARAMETERS USING MACHINE LEARNING TECHNIQUES

(71) Applicant: EMC IP Holding Company LLC, Hopkinton, MA (US)

(72) Inventors: Shou-Huey Jiang, Durham, NC (US); Bina K. Thakkar, Cary, NC (US); Deepak Gowda, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 267 days.

(21) Appl. No.: 16/929,271

(22) Filed: Jul. 15, 2020

(65) Prior Publication Data

US 2022/0019358 A1  Jan. 20, 2022

(51) Int. Cl.
  *G06F 3/06*  (2006.01)
  *G06N 5/04*  (2023.01)
  *G06N 20/00*  (2019.01)

(52) U.S. Cl.
  CPC .......... *G06F 3/0629* (2013.01); *G06F 3/0604* (2013.01); *G06F 3/067* (2013.01); *G06N 5/04* (2013.01); *G06N 20/00* (2019.01)

(58) Field of Classification Search
  CPC ...... G06F 3/0631; G06F 3/0629; G06N 20/00
  See application file for complete search history.

(56) References Cited

U.S. PATENT DOCUMENTS

| | | | |
|---|---|---|---|
| 7,930,476 B1 * | 4/2011 | Castelli | G06F 9/5011 711/170 |
| 10,324,643 B1 * | 6/2019 | Huang | G06F 3/0644 |
| 10,466,936 B2 | 11/2019 | Raitto et al. | |
| 10,567,222 B2 | 2/2020 | Shanks et al. | |
| 11,061,930 B1 * | 7/2021 | Golding | G06F 3/0611 |
| 2011/0219046 A1 * | 9/2011 | Nesmyanovich | G06F 16/00 707/812 |
| 2016/0026501 A1 * | 1/2016 | Polkovnikov | H04L 43/16 709/215 |
| 2018/0349366 A1 | 12/2018 | Baranowsky | |
| 2019/0288906 A1 | 9/2019 | Radhakrishnan et al. | |

* cited by examiner

*Primary Examiner* — Baboucarr Faal
(74) *Attorney, Agent, or Firm* — Ryan, Mason & Lewis, LLP

(57) ABSTRACT

Methods, apparatus, and processor-readable storage media for determining storage system configuration recommendations based on vertical sectors and size parameters using machine learning techniques are provided herein. An example computer-implemented method includes obtaining data pertaining to multiple storage systems; segmenting, into one or more segments, the multiple storage systems based on one or more vertical sectors and one or more size parameters of an enterprise associated with each storage system; identifying, within each of the segments, each storage system running one or more vertical sector-specific applications; clustering, within each of the segments, the storage systems running one or more vertical sector-specific applications based on configuration information using at least one machine learning technique; generating one or more storage system configuration templates based on the clustering; and performing one or more automated actions based on the one or more generated storage system configuration templates.

20 Claims, 7 Drawing Sheets

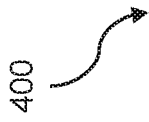

400

Calculate $d(x, x_i)$, wherein $i = 1, 2, ..., n$, and $d$ denotes the Euclidean distance between the points Arrange the calculated $n$ Euclidean distances in non-decreasing order Let $k$ be a positive integer, and take the first $k$ distances from this sorted list Find the $k$ points corresponding to these $k$ distances Let $k_j$ denote the number of points belonging to the $j^{th}$ class among $k$ points; i.e., $k \geq 0$ If $k_i > i \wedge k_j \neq j$, then put $x$ in class $i$

FIG. 4

DETERMINING STORAGE SYSTEM CONFIGURATION RECOMMENDATIONS BASED ON VERTICAL SECTORS AND SIZE PARAMETERS USING MACHINE LEARNING TECHNIQUES

FIELD

The field relates generally to information processing systems, and more particularly to storage in such systems.

BACKGROUND

With many storage systems available, it is often difficult for users to determine one or more storage systems that fit particular use cases. Also, a storage system meant for one vertical sector (e.g., finance) may not be optimal for use in a different vertical sector (e.g., healthcare). In addition to challenges in identifying appropriate storage systems for particular use cases, further challenges exist in determining proper and/or optimal configurations of given storage systems for particular use cases. Conventional storage system management approaches commonly rely on manual input and human insights, which can be error-prone and lead to improper and/or inefficient storage system configurations that are detrimental to storage performance, capacity, etc.

SUMMARY

Illustrative embodiments of the disclosure provide techniques for determining storage system configuration recommendations based on vertical sectors and size parameters using machine learning techniques. An exemplary computer-implemented method includes obtaining data pertaining to multiple storage systems, and segmenting, into one or more segments, the multiple storage systems based at least in part on one or more vertical sectors of an enterprise associated with each storage system and one or more size parameters of the enterprise associated with each storage system. The method also includes identifying, within each of the one or more segments, each storage system running one or more vertical sector-specific applications, and clustering, within each of the one or more segments, the storage systems running one or more vertical sector-specific applications based at least in part on configuration information using at least one machine learning technique. Further, the method additionally includes generating one or more storage system configuration templates based at least in part on the clustering, and performing one or more automated actions based at least in part on the one or more generated storage system configuration templates.

Illustrative embodiments can provide significant advantages relative to conventional storage system management approaches. For example, problems associated with improper and/or inefficient storage system configuration determinations are overcome in one or more embodiments through generating, using machine learning techniques, configuration templates based at least in part on vertical sector information and one or more size parameters.

These and other illustrative embodiments described herein include, without limitation, methods, apparatus, systems, and computer program products comprising processor-readable storage media.

BRIEF DESCRIPTION OF THE DRAWINGS

FIG. 4 shows example pseudocode for at least a portion of a machine learning clustering algorithm in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
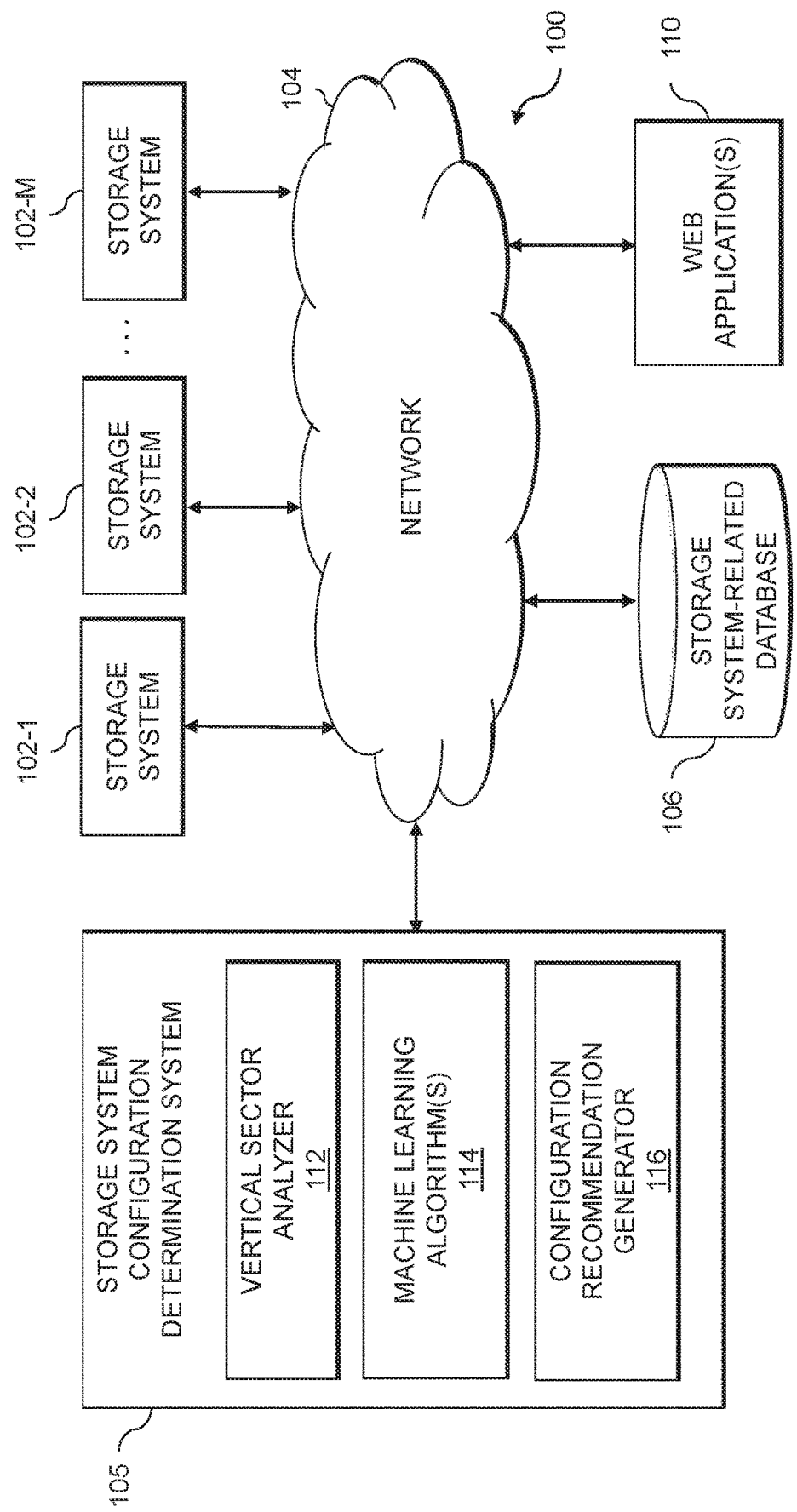
FIG. 1 shows an information processing system configured for determining storage system configuration recommendations based on vertical sectors and size parameters using machine learning techniques in an illustrative embodiment.

FIG. 1 shows a computer network (also referred to herein as an information processing system) 100 configured in accordance with an illustrative embodiment. The computer network 100 comprises a plurality of storage systems 102-1, 102-2, . . . 102-M, collectively referred to herein as storage systems 102. The storage systems 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is storage system configuration determination system 105 and one or more web applications 110 (e.g., storage management applications, monitoring applications, analytics applications, etc.).

The storage systems 102 may comprise, for example, storage clusters, storage area networks (SANs), network-attached storage (NAS), converged infrastructure (CI), and hyper-converged infrastructure (HCI). Storage systems 102 may also comprise, for example, mobile telephones, laptop computers, tablet computers, desktop computers or other types of computing devices. Such devices are examples of what are more generally referred to herein as "processing devices." Some of these processing devices are also generally referred to herein as "computers."

The storage systems 102 in some embodiments comprise respective computers associated with a particular company, organization, group of users or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, storage system configuration determination system 105 can have an associated database 106 configured to store data pertaining to storage systems, which comprise, for example, storage system configuration data, storage system capacity data, storage system performance data, etc.

The database 106 in the present embodiment is implemented using one or more storage systems associated with storage system configuration determination system 105. Such storage systems can comprise any of a variety of different types of storage including NAS, SANs, direct-attached storage (DAS) and distributed DAS, as well as combinations of these and other storage types, including software-defined storage.

Also associated with storage system configuration determination system 105 are one or more input-output devices, which illustratively comprise keyboards, displays or other types of input-output devices in any combination. Such input-output devices can be used, for example, to support one or more user interfaces to storage system configuration determination system 105, as well as to support communication between storage system configuration determination system 105 and other related systems and devices not explicitly shown.

Additionally, the storage system configuration determination system 105 in the FIG. 1 embodiment is assumed to be implemented using at least one processing device. Each such processing device generally comprises at least one processor and an associated memory, and implements one or more functional modules for controlling certain features of storage system configuration determination system 105.

More particularly, storage system configuration determination system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows storage system configuration determination system 105 to communicate over the network 104 with the storage systems 102, and illustratively comprises one or more conventional transceivers.

The storage system configuration determination system 105 further comprises a vertical sector analyzer 112, machine learning algorithm(s) 114, and a configuration recommendation generator 116.

It is to be appreciated that this particular arrangement of modules 112, 114 and 116 illustrated in the storage system configuration determination system 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for determining storage system configuration recommendations based on vertical sectors and size parameters using machine learning techniques involving storage systems 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114 and 116 of an example storage system configuration determination system 105 in computer network 100 will be described in more detail with reference to the flow diagram of FIG. 5.

Accordingly, at least one embodiment includes determining storage system configuration recommendations based on vertical sectors and size parameters using machine learning techniques. Such an embodiment includes using user data in connection with user storage system requirements as well as the user's vertical sector and size information.

Figure 2:
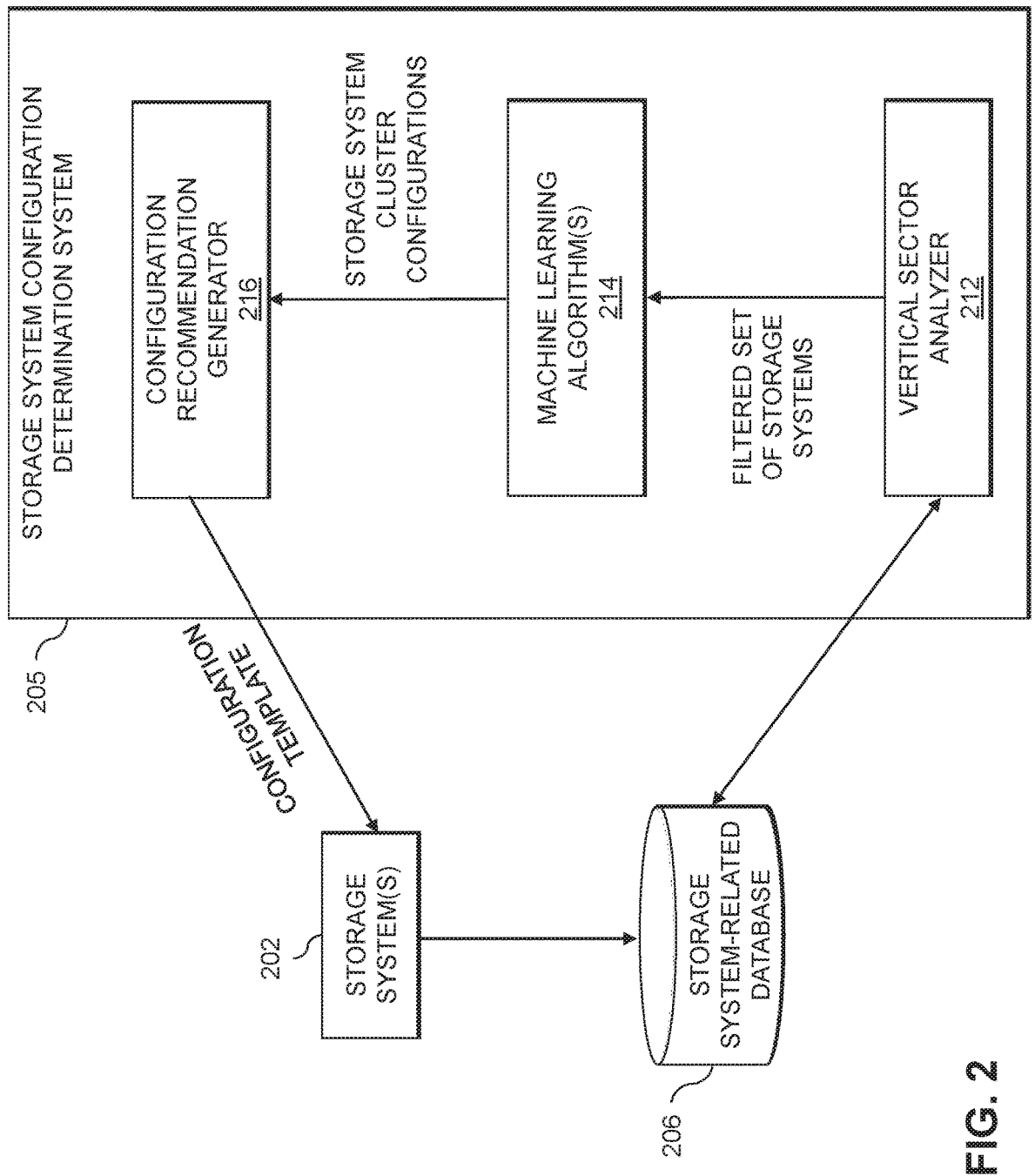
FIG. 2 shows an information processing system configured for determining storage system configuration recommendations based on vertical sectors and size parameters using machine learning techniques in an illustrative embodiment.

FIG. 2 shows an information processing system configured for determining storage system configuration recommendations based on vertical sectors and size parameters using machine learning techniques in an illustrative embodiment. By way of illustration, FIG. 2 depicts one or more storage systems 202 sending data to storage system-related database 206 (e.g., a data lake). Such data can include configuration data, capacity data, and/or performance data, and more specifically can include storage system model information, pool count, logical unit number (LUN) count, file system (FS) count, flash information, data reduction information, deduplication information, data reduction ratio, data protection information, read percentage information, block size information, etc.

As also depicted in FIG. 2, storage system configuration determination system 205 interacts with storage system-related database 206. Such interaction can include vertical sector analyzer 212 processing data from the storage system-related database 206 (e.g., data pertaining to multiple storage systems) to separate storage systems by vertical segments (also referred to herein as sectors) associated therewith, and to further separate such systems by corresponding company or enterprise size (small, medium, large, etc.) within each vertical segment. Once such separating and/or filtering has been carried out, the vertical sector analyzer 212 determines if the filtered storage systems are running vertical sector-specific applications. If yes (that is, the filtered storage systems are running vertical sector-specific applications), the vertical sector analyzer 212 identifies one or more of such systems with health scores that meet or surpass a given threshold. At least one embodiment includes calculating, using a rules-based engine in connection with storage system-related database 206 (e.g., a data lake) containing information pertaining to user storage systems, such health scores, which can include, for example, performing a set of health checks on at least a portion of the storage systems and providing information for any checks that fail (for example, checks related to components, configuration, capacity, performance, and data protection).

The vertical sector analyzer 212 then provides the final set of filtered storage systems to machine learning algorithm(s) component 214, which processes configuration information pertaining to the set of filtered storage systems to cluster the storage systems and output (to configuration recommendation generator 216) one or more storage system cluster configurations. The configuration recommendation generator 216 then, using the one or more storage system cluster configurations, generates and outputs a configuration template, which is applied to the storage system(s) 202.

In separating storage systems based on vertical segments/sectors, at least one embodiment includes deriving industry sector information through identifiers such as, for example, a Data Universal Numbering System (DUNS) number, which represents a unique, nine-digit series of numbers that identifies an enterprise, and corresponds to additional information such as the enterprise's name, phone number, address, number of workers and/or users, line and/or area of business, etc. As detailed above in connection with FIG. 2, once a collection of storage systems are separated by vertical segment, such an embodiment includes filtering the storage systems within each vertical segment based on the size of the enterprise that corresponds to the given storage system and/or based on the existence of vertical segment-specific applications running on the storage systems. Filtering based on the size of the enterprise that corresponds to the given storage system can include filtering, for example, based on the number of employees of the enterprise (e.g., 0-100 employees may be considered a "small" enterprise, while 101-999 employees may be considered a "medium-sized" enterprise, and 1,000 employees and above may be considered a "large" enterprise). Additionally or alternatively, filtering based on the size of the enterprise that corresponds to the given storage system can include filtering, for example, based on the size of revenues generated by the enterprise. In one or more embodiments, various size-based thresholds and/or definitions used for such filtering can be derived from government organizations, business organizations, etc.

As also noted above in connection with FIG. 2, filtered systems with sufficient health scores can be clustered using one or more unsupervised machine learning algorithms (e.g., at least one k-means clustering algorithm). In at least one embodiment, the configuration of each cluster represents the optimal configuration recommendation for the vertical sector applications of that cluster, and such a configuration can be saved as a template and ultimately applied to one or more relevant storage systems. It is also to be appreciated that different enterprises and/or users can leverage such a template and modify the configuration based on the particular requirements of the given enterprise and/or user.

Figure 3:
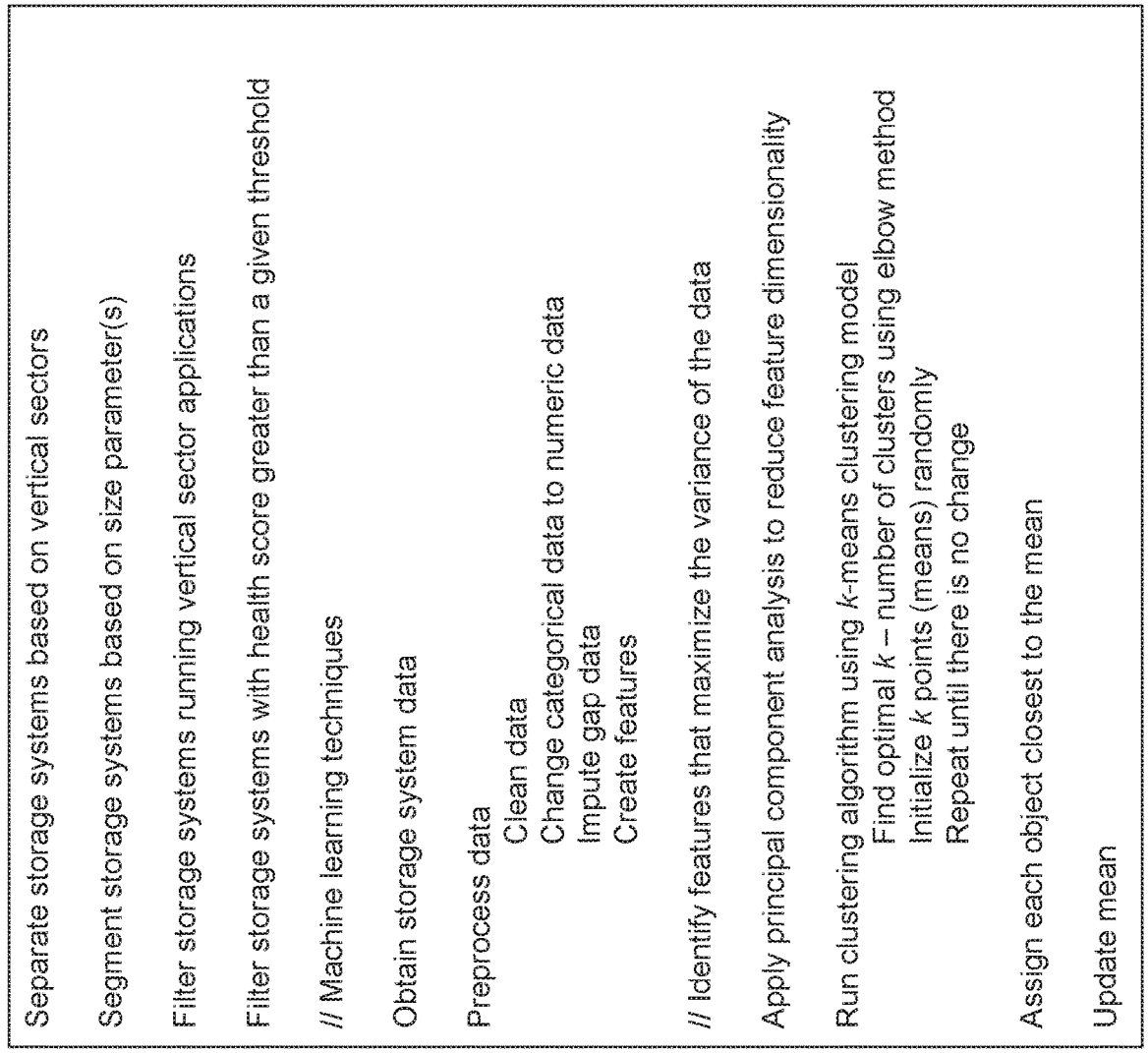
FIG. 3 shows example pseudocode for determining storage system configuration recommendations based on vertical sectors and size parameters in an illustrative embodiment.

As further detailed, for example, in connection with FIG. 3 and FIG. 4, one or more embodiments include clustering filtered storage systems using at least one machine learning algorithm such as, for instance, an unsupervised k-means clustering algorithm. In such an embodiment, each cluster represents similar storage applications and/or access patterns within a vertical sector, and the configuration associated with the cluster is the recommended optimal configuration for the related applications and/or access patterns within that vertical sector.

As also described herein, at least one embodiment includes filtering storage systems running vertical sector applications. In such an embodiment, storage systems associated with a given vertical sector may be running applications which are not specific for the vertical sector (e.g., word processing applications, email applications, human resource applications, etc.). Accordingly, such an embodiment includes identifying and/or filtering the storage systems running applications specific to the given vertical sector. By way of illustration, for a finance vertical sector, an example embodiment can include identifying and/or filtering storage systems running bank customer transaction applications, stock trading applications, etc. By way of further illustration, for a healthcare vertical sector, an example embodiment can include identifying and/or filtering storage systems running medical imaging applications, electronic health records applications, etc.

By way of example, in one or more embodiments, a user associated with at least one storage system provides a list of vertical sector applications, and/or a list of applications running on virtual machines monitored by one or more data lakes can be obtained (and/or can be provided by the user). Further, such an example embodiment also includes obtaining a list of storage systems and/or components connected to the noted virtual machines, as well as systems running one or more of the listed vertical sector applications.

Additionally or alternatively, at least one embodiment includes identifying and/or determining one or more vertical sector application access patterns. By way merely of illustration, examples of such patterns can include, in the context of electronic health record applications (within the healthcare sector), small transactions for writing and reading patient records, small usage of storage capacity, small block size, usage instances of writing once and reading multiple times, etc. Additional examples of such patterns can include, in the context of stock trading applications (within the financial sector), large numbers of small transactions to buy and sell stocks, small usage of storage capacity, small block size, similar amounts of read and write operations, etc.

FIG. 3 shows example pseudocode for determining storage system configuration recommendations based on vertical sectors and size parameters in an illustrative embodiment. In this embodiment, example pseudocode 300 can be executed by or under the control of at least one processing system and/or device. For example, the example pseudocode 300 may be viewed as comprising a portion of a software implementation of at least part of storage system configuration determination system 105 of the FIG. 1 embodiment.

The example pseudocode 300 illustrates steps including separating storage systems based on vertical sector, and segmenting those separated storage systems based on one or more size parameters (e.g., small, medium, and large enterprises, based on employees, revenues, etc.). The example pseudocode 300 also illustrates steps including filtering storage systems running vertical sector applications, and filtering storage systems with health scores greater than a given threshold. Additionally, the example pseudocode 300 illustrates using machine learning techniques to process data pertaining to the segmented and filtered storage systems. Specifically, example pseudocode 300 illustrates steps including obtaining storage system data (e.g., information pertaining to storage model, flash, compression, deduplication, capacity, disk count, disk type, disk, percentage read, block size, central processing unit (CPU) utilization, etc.) and preprocessing such data (e.g., cleaning the data, changing categorical data to numeric data, imputing gap data, creating one or more features, etc.).

As also depicted in FIG. 3, the example pseudocode 300 illustrates steps including identifying features that maximize the variance of the (preprocessed) data, which includes applying a principal component analysis to reduce feature dimensionality, and running a clustering algorithm using a k-means clustering model. Running such an algorithm can include finding and/or identifying an optimal k value to represent the number of clusters using, for example, an elbow method, initializing k points (means) randomly, and repeating the above steps until there is no change. More specifically, for every data point, the distance from the centroid (e.g., k points) will be calculated at each step. Once this distance no longer changes, the iteration of steps will be stopped. The example pseudocode 300 further illustrates steps including assigning each object closest to the mean, and updating the mean. That is, at the same time as part of the iteration step(s), a new centroid will be calculated for each cluster based on the mean of all data points assigned to that cluster.

It is to be appreciated that this particular example pseudocode shows just one example implementation of steps for determining storage system configuration recommendations based on vertical sectors and size parameters, and alternative implementations of the process can be used in other embodiments.

FIG. 4 shows example pseudocode for at least a portion of a machine learning clustering algorithm in an illustrative embodiment. In this embodiment, example pseudocode 400 can be executed by or under the control of at least one processing system and/or device. For example, the example pseudocode 400 may be viewed as comprising a portion of a software implementation of at least part of storage system configuration determination system 105 of the FIG. 1 embodiment.

The example pseudocode 400 illustrates steps including calculating $d(x, x_i)$, wherein i=1, 2, . . . , n, and wherein d denotes the Euclidean distance between the points in question. Additionally, the example pseudocode 400 illustrates steps including arranging the calculated n Euclidean distances in non-decreasing order, and, letting k be a positive integer, taking the first k distances from this sorted list. Further, the example pseudocode 400 illustrates steps including finding and/or identifying the k points corresponding to these k distances, and, letting k denote the number of points belonging to the $i^{th}$ class among k points (i.e., k≥0), putting x in class i if $k_i > k_j \forall i \neq j$.

It is to be appreciated that this particular example pseudocode shows just one example implementation of a machine learning clustering algorithm, and alternative implementations of the process can be used in other embodiments.

Figure 5:
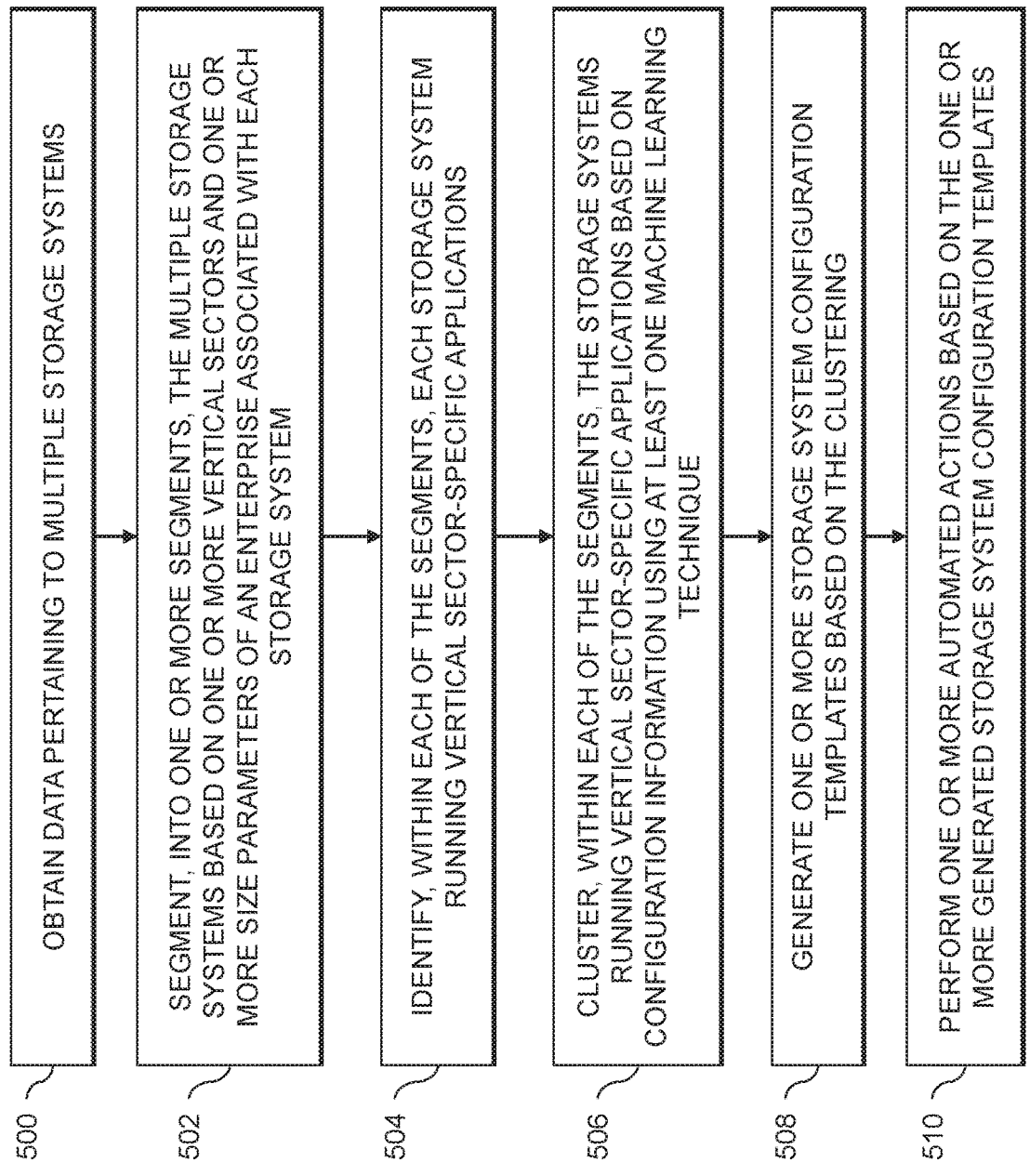
FIG. 5 is a flow diagram of a process for determining storage system configuration recommendations based on vertical sectors and size parameters using machine learning techniques in an illustrative embodiment.

FIG. 5 is a flow diagram of a process for determining storage system configuration recommendations based on vertical sectors and size parameters using machine learning techniques in an illustrative embodiment. It is to be understood that this particular process is only an example, and additional or alternative processes can be carried out in other embodiments.

In this embodiment, the process includes steps 500 through 510. These steps are assumed to be performed by storage system configuration determination system 105 utilizing its modules 112, 114 and 116.

Step 500 includes obtaining data pertaining to multiple storage systems. In at least one embodiment, obtaining the data pertaining to multiple storage systems includes obtaining one or more of configuration data, capacity data, and performance data. Step 502 includes segmenting, into one or more segments, the multiple storage systems based at least in part on one or more vertical sectors of an enterprise associated with each storage system and one or more size parameters of the enterprise associated with each storage system.

Step 504 includes identifying, within each of the one or more segments, each storage system running one or more vertical sector-specific applications. One or more embodiments also include identifying, among the storage systems running one or more vertical sector-specific applications, each storage system having a health score that exceeds a given threshold.

Step 506 includes clustering, within each of the one or more segments, the storage systems running one or more vertical sector-specific applications based at least in part on configuration information using at least one machine learning technique (e.g., an unsupervised k-means clustering algorithm). In at least one embodiment, using the at least one machine learning technique includes obtaining and processing storage system data, from the storage systems within each of the one or more segments, comprising information pertaining to one or more of storage model, flash storage, compression, deduplication, capacity, disk count, disk type, percentage read, block size, and central processing unit utilization. Such an embodiment can also include applying a principal component analysis technique to the processed storage system data to reduce dimensionality of the processed storage system data and/or determining one or more clusters among the processed storage system data using at least one unsupervised k-means clustering algorithm. Further, in an example embodiment, using the at least one unsupervised k-means clustering algorithm includes determining a k value, representing a number of clusters, using an elbow method.

Step 508 includes generating one or more storage system configuration templates based at least in part on the clustering. Step 510 includes performing one or more automated actions based at least in part on the one or more generated storage system configuration templates. In at least one embodiment, performing the one or more automated actions includes applying one of the one or more generated storage system configuration templates to a storage system associated with a vertical sector and one or more size parameters having at least a threshold level of similarity to those of the one or more clustered storage systems corresponding to the applied storage system configuration template. Additionally or alternatively, in at least one embodiment, performing the one or more automated actions includes storing the one or more generated storage system configuration templates in at least one database.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to generate configuration templates based at least in part on vertical sector information and one or more size parameters using machine learning techniques. These and other embodiments can effectively overcome problems associated with improper and/or inefficient storage system configuration determinations.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
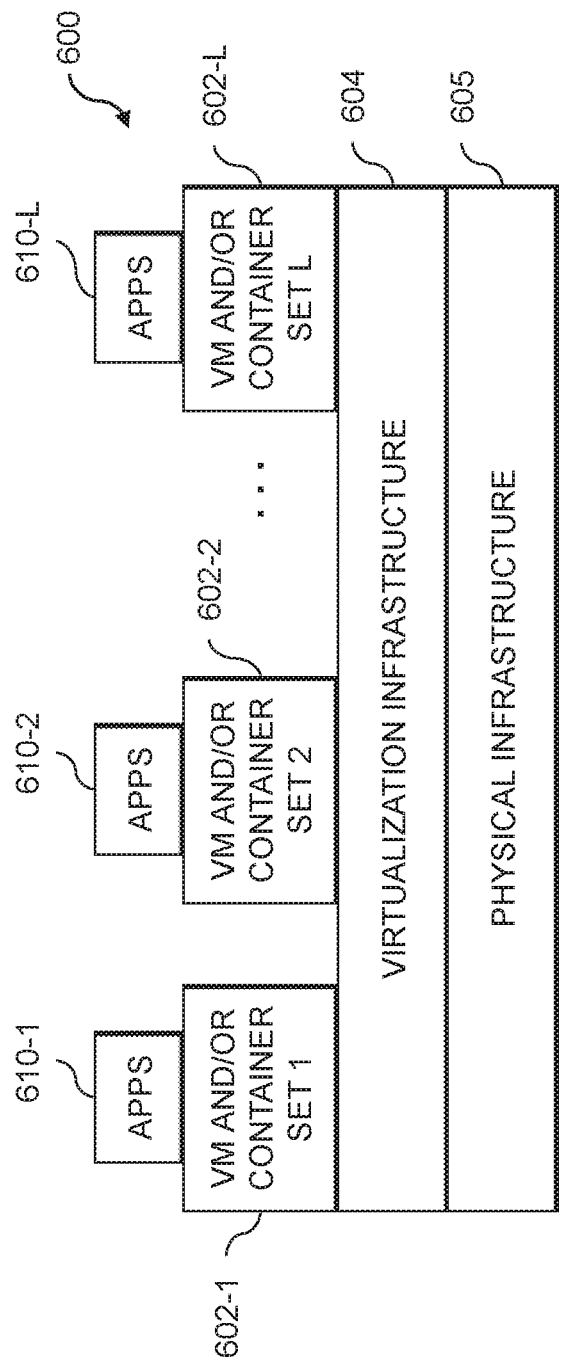
FIGS. 6 and 7 show examples of processing platforms that may be utilized to implement at least a portion of an information processing system in illustrative embodiments.
Figure 7:
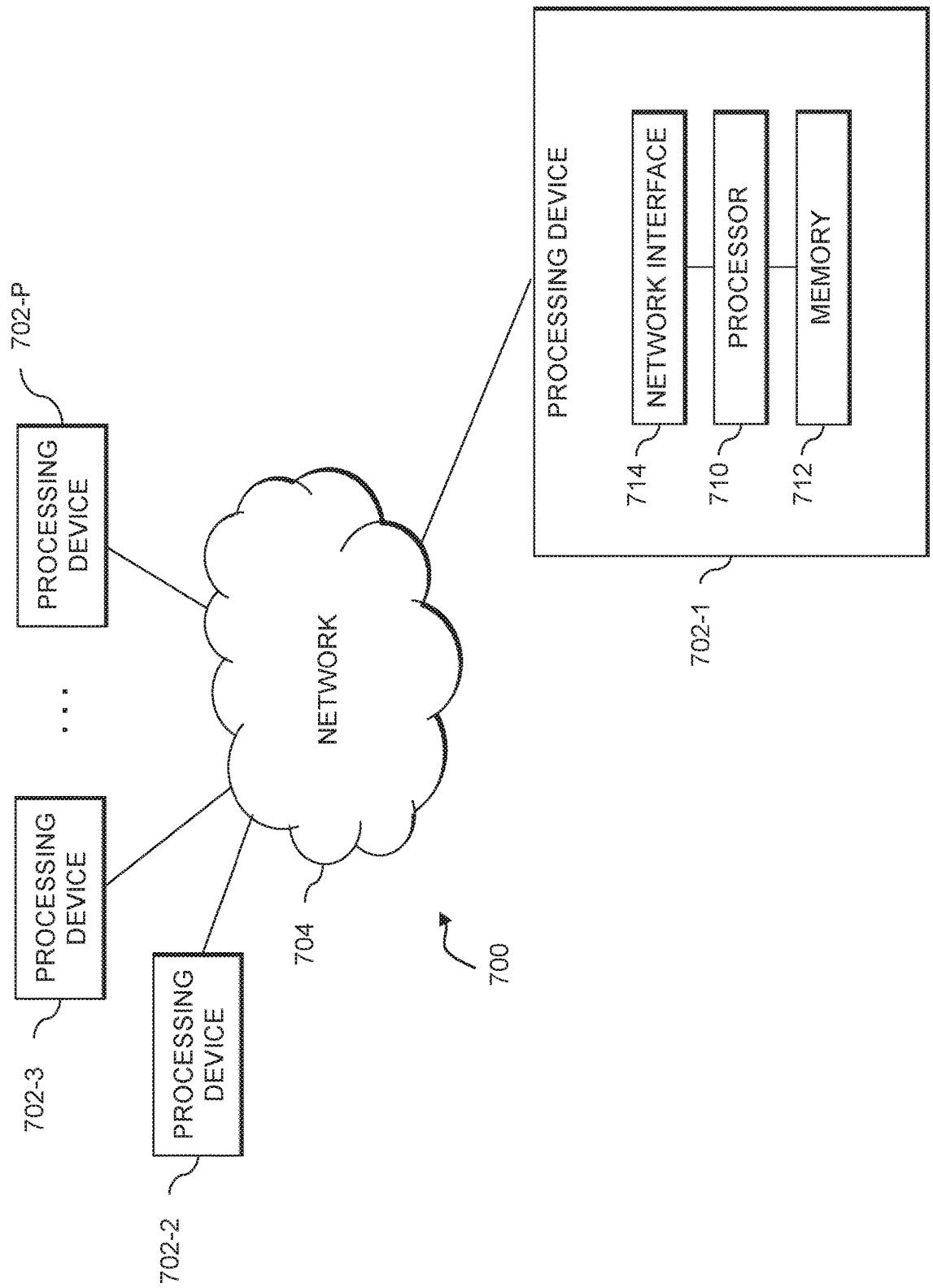

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-P, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an application-specific integrated circuit (ASIC), a field-programmable gate array (FPGA) or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

obtaining data pertaining to multiple storage systems;

separating, into two or more segments, the multiple storage systems based at least in part on one or more vertical sectors of an enterprise associated with each storage system, wherein separating based at least in part on one or more vertical sectors of an enterprise comprises deriving vertical sector information associated with the enterprise using identifying information, attributed to the enterprise, which corresponds to multiple aspects of enterprise operations;

filtering, from each of the two or more segments, each storage system that does not meet at least one of one or more size-related parameter thresholds corresponding to the enterprise associated with the storage system, wherein the one or more size-related parameter thresholds comprise at least one of a storage capacity-related threshold, a storage system performance-related threshold, and an enterprise resources-related threshold;

identifying, within each of the two or more filtered segments, each storage system running one or more vertical sector-specific applications;

clustering, within each of the two or more filtered segments, the storage systems running one or more vertical sector-specific applications based at least in part on configuration information using at least one machine learning technique in conjunction with one or more distance calculations;

generating one or more storage system configuration templates based at least in part on the clustering; and performing one or more automated actions based at least in part on the one or more generated storage system configuration templates;

wherein the method is performed by at least one processing device comprising a processor coupled to a memory.

2. The computer-implemented method of claim 1, wherein performing the one or more automated actions comprises applying one of the one or more generated storage system configuration templates to a storage system associated with a vertical sector and an enterprise size having at least a threshold level of similarity to those of the one or more clustered storage systems corresponding to the applied storage system configuration template.

3. The computer-implemented method of claim 1, wherein using the at least one machine learning technique comprises obtaining and processing storage system data, from the storage systems within each of the two or more filtered segments, comprising information pertaining to one or more of storage model, flash storage, compression, deduplication, capacity, disk count, disk type, percentage read, block size, and central processing unit utilization.

4. The computer-implemented method of claim 3, further comprising:
applying a principal component analysis technique to the processed storage system data to reduce dimensionality of the processed storage system data.

5. The computer-implemented method of claim 3, further comprising:
determining one or more clusters among the processed storage system data using at least one unsupervised k-means clustering algorithm.

6. The computer-implemented method of claim 5, wherein using the at least one unsupervised k-means clustering algorithm comprises determining a k value, representing a number of clusters, using an elbow method.

7. The computer-implemented method of claim 1, further comprising:
identifying, among the storage systems running one or more vertical sector-specific applications, each storage system having a health score that exceeds a given threshold.

8. The computer-implemented method of claim 1, wherein obtaining the data pertaining to multiple storage systems comprises obtaining one or more of configuration data, capacity data, and performance data.

9. The computer-implemented method of claim 1, wherein the at least one machine learning technique comprises at least one unsupervised k-means clustering algorithm.

10. The computer-implemented method of claim 1, wherein performing the one or more automated actions comprises storing the one or more generated storage system configuration templates in at least one database.

11. A non-transitory processor-readable storage medium having stored therein program code of one or more software programs, wherein the program code when executed by at least one processing device causes the at least one processing device:

to obtain data pertaining to multiple storage systems;
to separate, into two or more segments, the multiple storage systems based at least in part on one or more vertical sectors of an enterprise associated with each storage system, wherein separating based at least in part on one or more vertical sectors of an enterprise comprises deriving vertical sector information associated with the enterprise using identifying information, attributed to the enterprise, which corresponds to multiple aspects of enterprise operations;
to filter, from each of the two or more segments, each storage system that does not meet at least one of one or more size-related parameter thresholds corresponding to the enterprise associated with the storage system, wherein the one or more size-related parameter thresholds comprise at least one of a storage capacity-related threshold, a storage system performance-related threshold, and an enterprise resources-related threshold;
to identify, within each of the two or more filtered segments, each storage system running one or more vertical sector-specific applications;
to cluster, within each of the two or more filtered segments, the storage systems running one or more vertical sector-specific applications based at least in part on configuration information using at least one machine learning technique in conjunction with one or more distance calculations;
to generate one or more storage system configuration templates based at least in part on the clustering; and
to perform one or more automated actions based at least in part on the one or more generated storage system configuration templates.

12. The non-transitory processor-readable storage medium of claim 11, wherein performing the one or more automated actions comprises applying one of the one or more generated storage system configuration templates to a storage system associated with a vertical sector and an enterprise size having at least a threshold level of similarity to those of the one or more clustered storage systems corresponding to the applied storage system configuration template.

13. The non-transitory processor-readable storage medium of claim 11, wherein using the at least one machine learning technique comprises obtaining and processing storage system data, from the storage systems within each of the two or more filtered segments, comprising information pertaining to one or more of storage model, flash storage, compression, deduplication, capacity, disk count, disk type, percentage read, block size, and central processing unit utilization.

14. The non-transitory processor-readable storage medium of claim 13, wherein the program code when executed by the at least one processing device further causes the at least one processing device:
to apply a principal component analysis technique to the processed storage system data to reduce dimensionality of the processed storage system data.

15. The non-transitory processor-readable storage medium of claim 13, wherein the program code when executed by the at least one processing device further causes the at least one processing device:
to determine one or more clusters among the processed storage system data using at least one unsupervised k-means clustering algorithm.

16. An apparatus comprising:
at least one processing device comprising a processor coupled to a memory;
the at least one processing device being configured:
to obtain data pertaining to multiple storage systems;
to separate, into two or more segments, the multiple storage systems based at least in part on one or more vertical sectors of an enterprise associated with each storage system, wherein separating based at least in part on one or more vertical sectors of an enterprise comprises deriving vertical sector information associated with the enterprise using identifying information, attributed to the enterprise, which corresponds to multiple aspects of enterprise operations;
to filter, from each of the two or more segments, each storage system that does not meet at least one of one or more size-related parameter thresholds corresponding to the enterprise associated with the storage system, wherein the one or more size-related parameter thresholds comprise at least one of a storage capacity-related threshold, a storage system performance-related threshold, and an enterprise resources-related threshold;
to identify, within each of the two or more filtered segments, each storage system running one or more vertical sector-specific applications;
to cluster, within each of the two or more filtered segments, the storage systems running one or more vertical sector-specific applications based at least in part on configuration information using at least one machine learning technique in conjunction with one or more di stance calculations;
to generate one or more storage system configuration templates based at least in part on the clustering; and
to perform one or more automated actions based at least in part on the one or more generated storage system configuration templates.

17. The apparatus of claim 16, wherein performing the one or more automated actions comprises applying one of the one or more generated storage system configuration templates to a storage system associated with a vertical sector and an enterprise size having at least a threshold level of similarity to those of the one or more clustered storage systems corresponding to the applied storage system configuration template.

18. The apparatus of claim 16, wherein using the at least one machine learning technique comprises obtaining and processing storage system data, from the storage systems within each of the two or more filtered segments, comprising information pertaining to one or more of storage model, flash storage, compression, deduplication, capacity, disk count, disk type, percentage read, block size, and central processing unit utilization.

19. The apparatus of claim 18, wherein the at least one processing device is further configured:
to apply a principal component analysis technique to the processed storage system data to reduce dimensionality of the processed storage system data.

20. The apparatus of claim 18, wherein the at least one processing device is further configured:
to determine one or more clusters among the processed storage system data using at least one unsupervised k-means clustering algorithm.

* * * * *